Nov. 15, 1955  W. F. STAHL  2,723,605
APPARATUS FOR MAKING LAMINATED TUBES
Filed Aug. 19, 1950  4 Sheets-Sheet 1
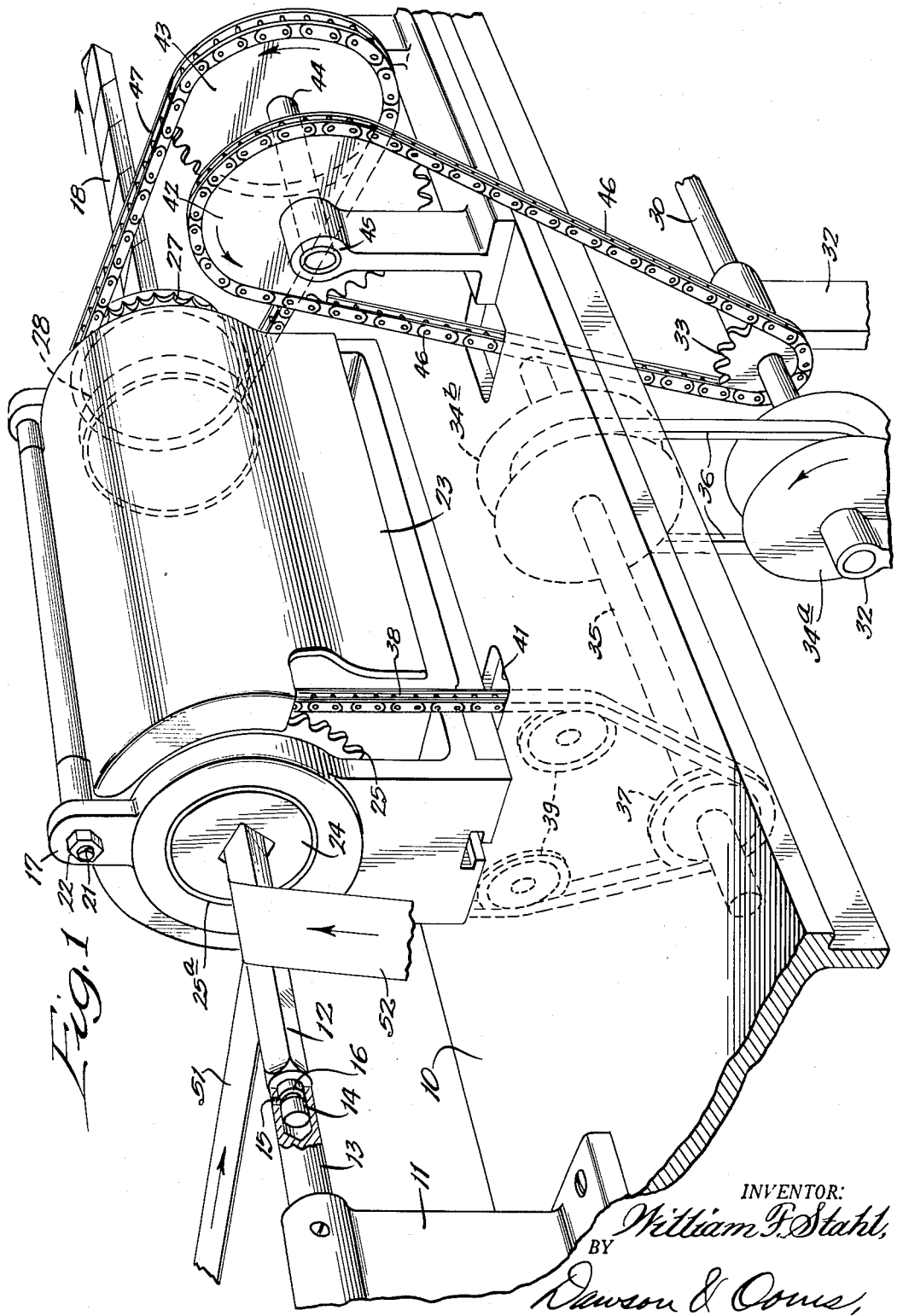
INVENTOR:
William F. Stahl,
BY
Dawson & Ooms,
ATTORNEYS.

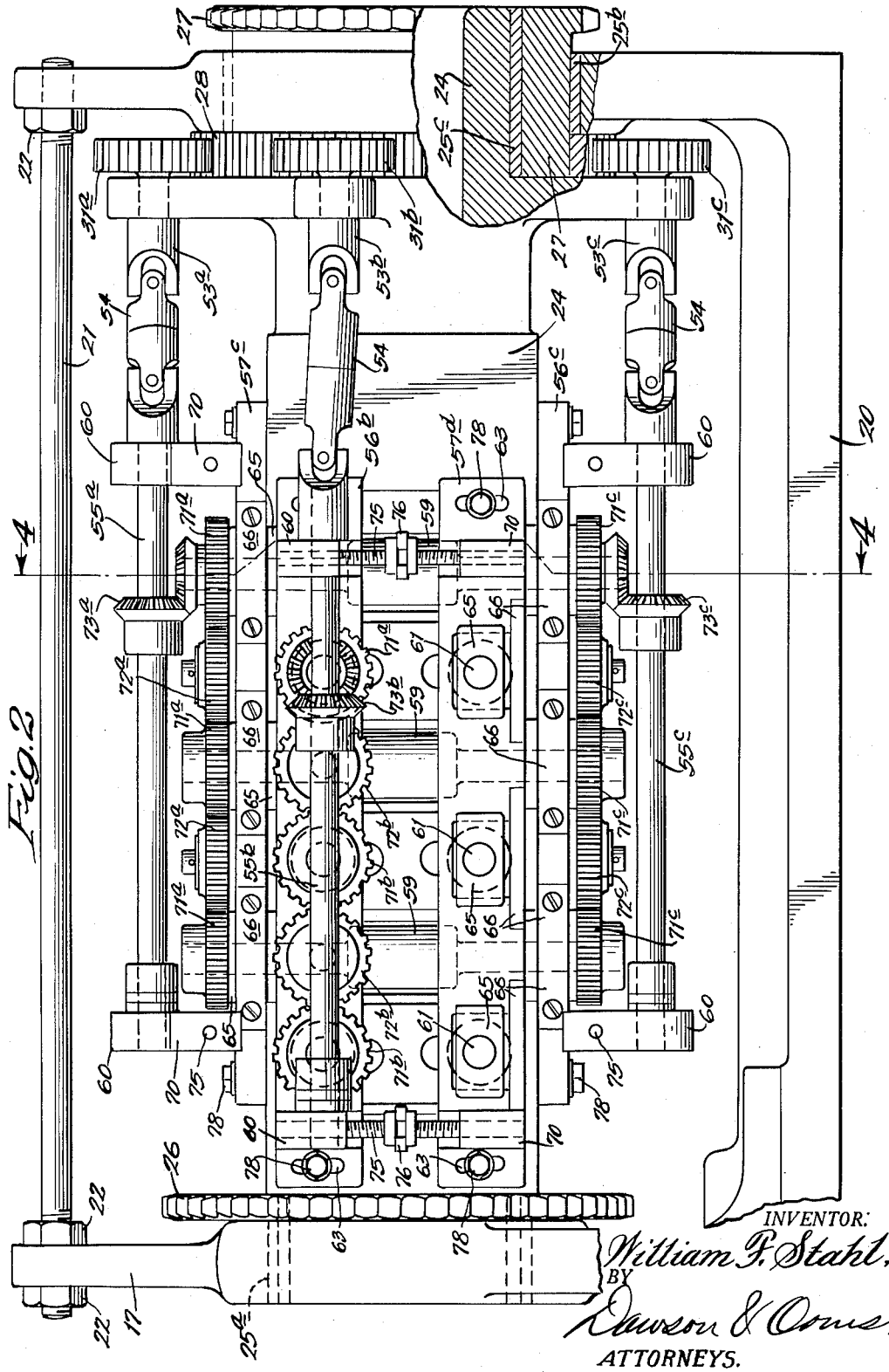

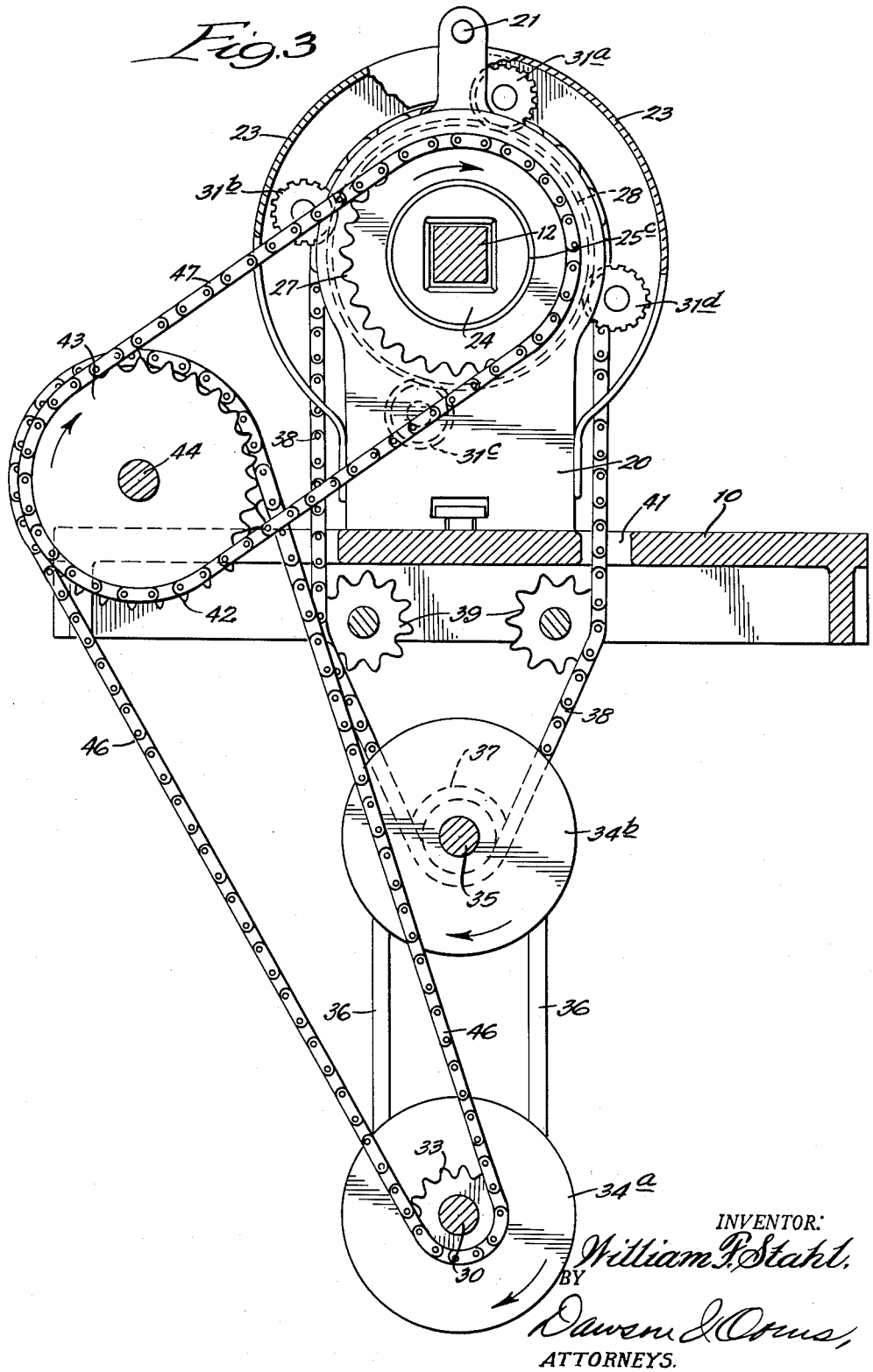

Nov. 15, 1955 W. F. STAHL 2,723,605
APPARATUS FOR MAKING LAMINATED TUBES
Filed Aug. 19, 1950 4 Sheets-Sheet 4
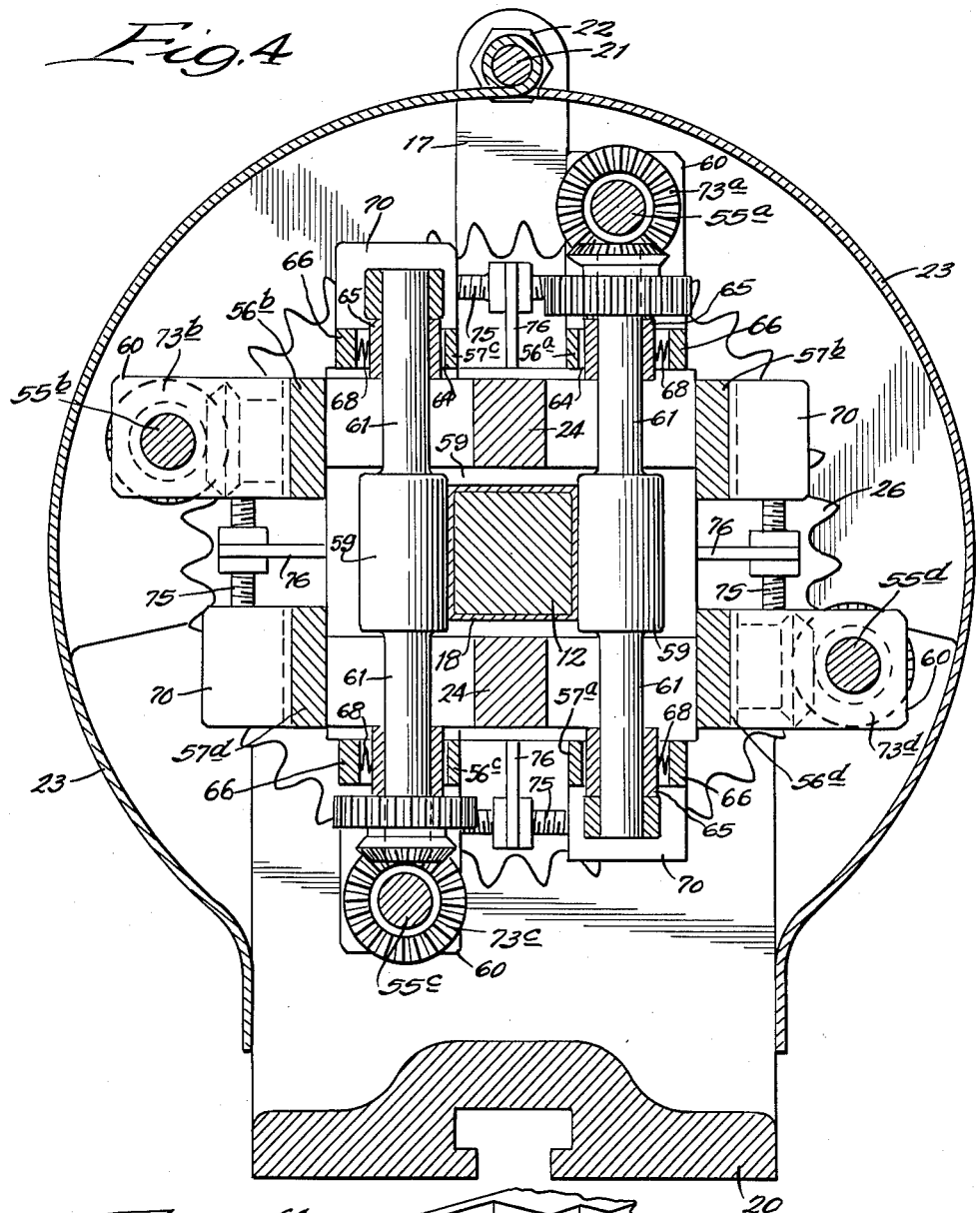
INVENTOR:
William F. Stahl,
BY
Dawson & Ooms
ATTORNEYS.

United States Patent Office 2,723,605
Patented Nov. 15, 1955

2,723,605

APPARATUS FOR MAKING LAMINATED TUBES

William F. Stahl, Kenilworth, Ill.

Application August 19, 1950, Serial No. 180,407

4 Claims. (Cl. 93—80)

This invention relates to apparatus for manufacture of laminated tubes; in particular, it concerns a machine for continuous production of laminated tubes of non-circular cross-section.

The laminated tube industry is an increasingly important one. In addition to the old and well-known application of such tubes as containers for shipping long, thin objects, they are being used in ever-increasing numbers as coil forms in electrical apparatus; and for other purposes. The laminated tubes to which this invention pertains are usually made of super-imposed paper strips, but they may in practice be assembled from any flexible fibrous sheet capable of being wrapped tightly into position without losing its shape. While, therefore, I shall in this specification frequently refer to the use of paper stock in the fabrication of laminated tubes, it will be understood that my invention is not limited to the use of such stock but is universally applicable to the manufacture of laminated tubes, regardless of the raw material employed.

The early industrial demand for laminated tubes was almost entirely limited to tubes of circular cross-section. This limitation of demand was not due particularly to any inherent desirability of round tubes, but was occasioned primarily by the fact that methods were developed at a rather early date for making round tubes rapidly and cheaply by automatic machinery. Since such tubes, having a circular cross-section, were suitable for mailing containers and most of the other early applications for laminated tubes, it is understandable that they were used virtually to the exclusion of other types of tubes, because of their low price and easy availability.

Electrical applications, however, frequently require laminated tubes having a rectangular cross-section, and, in some cases, cross-sections of irregular shape. In recent years, to a greater and greater extent, demand has increased for so-called "square" laminated tubes, a term which is used in the industry and will be used here to denote any laminated tube having a generally rectangular cross-section.

As the demand for square tubing reached commercial proportions, numerous efforts were made by persons skilled in the art to develop a "square tube" machine which would mass-produce square tubing. Prior to the development of the present invention, only one such machine had been commercially successful. That was a machine wherein the mandrel, which served as a form for wrapping the laminations, was rotated and at the same time advanced axially. In that machine, it was necessary to stop production of tubing each time the tubing reached its most advanced position, and production was discontinued until the mandrel had been retracted to its starting position. While the duration of any individual interval of mandrel retraction was short, the effect of the non-continuous operation was to make the machine produce tubing only about one-half the time it was operating, the remaining time being consumed in mandrel retraction.

The present invention is concerned with a square tube machine that produces tubing continuously at a constant rate, thus utilizing productively 100% of its operating time. The present invention, therefore, is capable of manufacturing square tubing much more cheaply and more rapidly than machines of the prior art.

It may, accordingly, be stated as the principal object of my invention to provide a machine capable of speedily and efficiently manufacturing laminated tubing of non-circular cross-section.

Another object of my invention is to provide a square tube machine which will make tubing of rectangular cross-section continuously and at a constant rate from strip or sheet stock.

Still another object of my invention is to create a machine for mass-production of square tubing wherein the mandrel is rotated but held against movement in the axial direction.

A still further object of my invention is to provide a tube-making machine capable of continuously and efficiently producing rectangular tubes, wherein the shaping and advancement of the tube is accomplished by novel mechanical structure containing driven rollers which provide axial impetus for the tube while rotating with the tube and mandrel.

Other objects and advantages of my invention will appear as the specification proceeds.

I have shown an illustrative embodiment of my invention in the accompanying drawing, of which—

Figure 1 is a perspective view of a machine for manufacturing rectangular tubing according to my invention; Fig. 2 is a side elevation view, partly in section, of the Fig. 1 machine with its covers removed; Fig. 3 is an end elevation view, partly in section, of the Fig. 1 machine, showing some of the details of the drive mechanism; Fig. 4 is a transverse sectional view taken along the line 4—4 of Fig. 2; and Fig. 5 is a fragmentary perspective view of part of the structure of my invention, showing how the apparatus can be adjusted to manufacture tubing of the desired size and shape.

Referring now to the drawing, and in particular to Fig. 1, I show my machine mounted on a rigid table 10 which will normally be formed of steel. An upright support member 11 provides at its upper extremity a cylindrical bearing for the rotatable mandrel 12. Mandrel 12 comprises two parts—a rear portion 13 of circular cross-section which is carried and rotated within the bearing at the top of support 11, and a forward portion of square cross-section which is provided with a coupling portion 14, of reduced diameter, which fits within a socket provided therefor in the forward end of portion 13. A set-screw 15 may engage an annular groove 16 in coupling member 14 for the purpose of locking rear mandrel portion 13 to the main, rectangular portion of mandrel 12. The purpose underlying the construction just described is to facilitate removal of one square mandrel and substitution of another having different dimensions whenever a change in the size of the square tubing is desired.

Mandrel 12 extends forward in the horizontal plane, through and somewhat beyond the far end of the covered forming machine 17 which is rigidly mounted on table 10. The outer end of mandrel 12 cannot be observed in Fig. 1, since it is covered at that point by the finished laminated tube 18. Normally, however, mandrel 12 will extend a short distance beyond the far end of the forming machine 17.

Forming machine 17 includes a massive frame member 20 having a base portion and vertical upright extensions at each end thereof; the upright extensions being joined by an elongated supporting bolt and hinge 21. Suitable nuts 22 are used to anchor supporting bolt 21 firmly. A pair of hinged covers 23 are supported on bolt hinge 21.

Hereinafter, I shall describe in detail the structure and operation of the moving parts carried within forming machine 17. For the present, I wish to describe the outer drive mechanism and for that purpose it will be sufficient to state that forming machine 17 contains a subframe structure 24, mounted for rotation, within bearings 25a and 25b provided by the upright portions of frame 20, and also contains a number of smaller moving parts which must be driven independently for rotation on their own axes while revolving, around the axis of subframe 24, as parts of the subframe assembly of forming machine 17.

Rotation as a whole of the subframe assembly 24 is accomplished by driving a sprocket 26, keyed to or formed integrally as a part of the outer end of subframe 24 just adjacent the inner face of bearing 25a.

The positive drive for independently rotating the smaller moving parts within subframe assembly 24 is provided by sprocket gear 27, which is formed with a shaft extending axially a considerable distance and serving as a collar or concentric annular cover for the end of frame structure 24. Sprocket 27 rotates independently of frame member 24; the outer surface of sprocket 27 turns in bearing surface 25b, while its inner surface, in turn, is equipped with a bearing surface 25c which receives main subframe member 24 (see Fig. 2).

Keyed, as by shrinking, to the innermost portion of the shank or shaft portion of sprocket 27, is a pinion gear 28 which functions as a sun or driving gear for the four planet gears 31a, 31b, 31c and 31d. Those planet gears, by means to be described later, drive the moving parts within subframe assembly 24.

The prime mover (not shown) for the machine may be connected to accomplish rotation of drive-shaft 30, which is supported within bearings 32 at a suitable location adjacent table 10. In the present embodiment, shaft 30 is shown as passing under table 10.

Keyed to shaft 30 are a sprocket gear 33 and a multi-diameter pulley 34a. Pulley 34a cooperates with a corresponding multi-diameter pulley 34b, which is carried on a countershaft 35 suitably supported in any convenient manner below table 10. A belt 36 couples pulleys 34a and 34b. The multi-diameter construction of the two pulleys permits the adjustment of belt 36 to any of several positions, so as to provide a selection of relative speeds for shafts 35 and 30.

A sprocket gear 37 is also keyed to shaft 35 at a point directly below sprocket gear 25, and a sprocket chain 38 couples sprocket 37 and sprocket 25. A pair of idler sprockets 39, one or both of which may be made adjustable, are mounted on the underside of table 10 for cooperation with chain 38. Sprockets 39 assist in keeping chain 38 taut and serve to protect it from being displaced from sprocket 37 or sprocket 25. A pair of suitable apertures 41 are provided in the top of table 10 to provide passage for sprocket chain 38.

A pair of sprocket gears, respectively denoted 42 and 43, are keyed to a shaft 44, which, in turn, is supported above table 10 in bearings 45. Sprocket 42 is driven from sprocket 33 by sprocket chain 46; sprocket 43 drives sprocket 27 via sprocket chain 47.

From the foregoing description, it may be seen that upon rotation of drive-shaft 30, sprocket 25 will be rotated and will thereby turn, as a whole, subframe assembly 24, together with all the parts carried thereon. At the same time, sprocket 27 will be rotated and will thereby rotate planet gears 31a, 31b, 31c and 31d. These planet gears will be rotated relative to the main body of subframe assembly 24, at a speed which will be determined by the relative speeds of sprockets 25 and 27. I have, in the embodiment shown, provided in pulleys 34a and 34b, the means for altering the relative speeds of sprockets 25 and 27 and thus altering the speed of rotation of the planet gears 31 relative to the subframe assembly 24. It will be understood that the speed control means shown is merely illustrative, and any desired method of varying the relative speeds of sprockets 25 and 27 may be employed.

I show (see Fig. 1) a pair of paper strips respectively denoted 51 and 52, feeding onto mandrel 12 at a point a short distance back of the "upstream" end of forming machine 17. These strips will normally be fed from spools, suitably mounted on or adjacent table 10. It will be understood that my showing or two laminar strips is purely for purposes of illustration. If laminated tubing of three or more plies be desired, the appropriate number of stock spools will, of course, be mounted adjacent mandrel 12 and their strip stock appropriately fit into place on mandrel 12. It will also be understood that, in accordance with conventional laminated-tube manufacturing practice, all the laminar strips other than the lowermost one may be coated with adhesive prior to being fed to mandrel 12.

As subframe assembly 24 is rotated by sprocket 25, mandrel 12 is caused to rotate at the same speed, and the laminar strips 51 and 52 (and any others that may be in use) are drawn off their respective spools and wrapped in appropriate order over mandrel 12 to form a laminated tube having inner dimensions governed by the size and shape of mandrel 12.

I shall now describe in some detail the structure carried on subframe assembly 24. While in the following description of its structure, subframe assembly 24 will be treated as though it were stationary, it should be recalled that that assembly is rotated as a whole by sprocket 26. Therefore, parts designated as moving parts in the following description of subframe assembly 24 are those parts which move relatively to the assembly itself in addition to moving with respect to the main frame 20 as a result of the gross rotation of subframe 24.

Each of the planet gears 31a, 31b, 31c and 31d is keyed to a shaft which is journaled within a suitable bearing provided in subframe 24 (see Fig. 2). The shafts which carry the planetary gears are held against axial movement by enlarged shoulder portions 53a, 53b, 53c and 53d (shoulder 53d is not visible on the drawing, but is associated with the shaft carrying gear 31d). Each of the shoulder portions 53a–d, inclusive, is terminated in a flexible coupling member 54, which permits planet gears 31a–d, inclusive, to drive shafts 55a–d, inclusive. The universal joints 54 are employed to permit positional adjustments of the forming rollers, to be described hereinafter, while at the same time providing for them a positive drive.

The shafts 55a–d, inclusive, are carried in bearings supported by adjustable blocks 56a–d, respectively. An illustrative block 56 is shown in perspective in Fig. 5. The blocks 56 are disposed symmetrically around the subframe 24, as shown in Fig. 4. Cooperating with the adjustable bearing blocks 56a–d, are four additional bearing blocks denoted 57a–d, respectively. Each pair of bearing blocks—that is, for example, blocks 56a and 57a, 56b and 57b, and so on—provide bearings for three roller-carrying shafts. As may be seen from Fig. 4, the roller shafts received within the bearing blocks 56a—57a and the blocks 56c—57c are parallel and spaced apart. Similarly, the roller shafts carried by bearing blocks 56b—57b and 56d—57d are parallel and are at right angles to the first set of roller shafts. Adjoining pairs of roller shafts in each of the sets are spaced apart to provide clearance for the corresponding pair of the other set. This construction may be seen clearly from Fig. 2. From that figure, it may be seen that there are a total of twelve rollers provided in the interior of subframe 24. It will be unnecessary to separately designate the twelve rollers, but the rollers are, for convenience, generally designated 59, while the roller shafts are designated 61.

It will be understood that my choice of three rollers per side is purely illustrative; the number of rollers employed in a particular machine, and the precise manner of their distribution, are matters of choice to be determined by the requirements of the application.

The construction of the adjustable bearing blocks 56 and 57 is quite clearly shown in the perspective view of Fig. 5. That figure shows one of the bearing blocks 56 or 57.

Referring now to Fig. 5, it will be noted that the upper surface of the block contains a shallow, transverse recess 62. In blocks 56, recess 62 carries a tall, upright bearing member 60 which supports one of the shafts 55 and at the same time provides anchorage for a turnbuckle 75, to be described later. In blocks 57, recess 62 receives a lower block 70, which functions only to receive the turnbuckle 75. Through each of the blocks 56 and 57, between recess 62 and the end of the block, I have provided an elongated slot 63, which passes entirely through the thickness of the block. These slots 63 are for the purpose of permitting positional adjustments of the blocks 56 and 57. While only one end of block 56 can be seen in Fig. 5, it will be understood that the opposite end is similarly constructed, carrying another symmetrically disposed recess 62 and another slot 63. Intermediate the ends of the bearing blocks 56 and 57, three deep recesses 64 are cut; these are adapted to receive bearings 65, which may be made of bronze or other suitable bearing material. Bearings 65 are formed to slide smoothly into the recesses 64, and are held in place by bars 66. The bars 66 fit within recesses 67 in the blocks 56 and may be held in position by screws threaded into suitably tapped holes in blocks 56. It is desirable that the bearings 65 have a limited degree of freedom and that they be urged inwardly, so as to maintain the rollers 59 in close contact with mandrel 12 which passes through the axial open space in the center of subframe 24. To accomplish this, each of the bearings 65 contains a pair of small cylindrical recesses 67 which provide a seat for coil springs 68, bar 66 providing in each case an opposing spring seat. Springs 68 thus urge bearings 65 inwardly, so as to press rollers 59 firmly against mandrel 12. It will, of course, be understood that each of the bearings 65 is provided with a cylindrical opening adapted to receive a shaft 61.

The ends of shafts 61 which enter bearing blocks 57 are terminated within the bearings. The opposite ends of the shaft 61, however, pass entirely through the bearing blocks 56 and carry on their outer ends spur gears 71. In the drawing, these spur gears are designated 71 with an appropriate letter a, b, c or d, identifying the spur gears with the planetary gear 31 which provides their driving impetus. Each set of three spur gears 71 is linked by a pair of idler gears 72. As may be noted from Fig. 2, this arrangement insures that rotation of any gear in a set of gears 71 will result in all the gears of that set (and consequently all the rollers of that set) rotating at the same speed.

Torque for rotating the four sets of rollers is provided from the shafts 55 by means of four sets of bevel gears 73. The respective sets of bevel gears are designated on the drawing 73a, 73b, etc. One gear of each set 73 is keyed to a shaft 55, while its mating bevel gear is keyed to the end of a shaft 61. Thus rotation of a given shaft 55 produces rotation, at identical speeds, of one of the sets of three rollers 59. Since all the planet gears 31, and accordingly, all the shafts 55, are compelled by sun gear 28 to rotate at the same speed, the gearing structure just described results in positive drive of the rollers 59 at uniform speed. (It will be apparent to persons skilled in the art that rotation of the rollers 59 will depend on nonuniformity of the speeds of sprockets 26 and 27. If sprockets 26 and 27 be rotating at the same speed, there will be no rotation of rollers 59.)

To permit adjustment of the spacing between the rollers 59 in the zone occupied by mandrel 12, I have provided a set of turnbuckle-like members 75, the centers of which are anchored to the frame 24 by slotted uprights 76. The oppositely-disposed shanks of turnbuckle members 75 are threaded into suitably tapped holes in the respective sets of bearing blocks 60 and 70, carried respectively in slots 62 within the main bearing blocks 56 and 57. The oppositely-disposed shanks of members 75 are threaded in opposite directions, and the taps in the bearing blocks are correspondingly cut. As may be seen from either Fig. 2 or Fig. 4, the members 75, on being rotated, will pull the main bearing blocks 56 and 57 toward or away from one another with their respective sets of parallel rollers. In other words, one pair of members 75 couple bearing block 56b to block 57d; another pair of members 75 join bearing block 56a to block 57c, and so on.

The bearing blocks 56 and 57 are secured to subframe 24 by bolts 78, which pass through slots 63. When adjustment of the roller spacing is desired, bolts 78 are loosened and members 75 rotated until the spacing between the respective pairs of parallel roller sets is as desired. When the correct setting has been achieved, bolts 78 are again tightened and the machine is locked in position until another adjustment is desired. As may be noted from the drawing, the spacing between one set of six parallel rollers need not be the same as that of the other six. In other words, my machine is not limited to making tubing which is square in the geometrical sense, but can be easily adjusted to make tubing rectangular in shape having sides of unequal length.

Similarly, it will be apparent to those skilled in the art that the principles of my invention are not limited even to the formation of four-sided rectangular tubes but could as well be applied in a machine designed for making five-sided tubing, hexagonal tubing, or such other shape as might be desired. A machine for making laminated tubing of pentagonal or hexagonal cross-section would merely involve the use of five or six planet gears 31, with appropriate provision for five or six roller sets with their drive gearing, instead of four as shown in the drawing.

*Operation*

In the operation of my machine, as may be seen from Fig. 1, the rollers 59 are first adjusted so as to provide through the center of subframe 24 a passage slightly smaller in cross-sectional area than that of the mandrel 12 to be employed. The mandrel 12 is then passed through the center of subframe 24, the rollers 59 yielding sufficiently, by compression of springs 68, to give the mandrel 12 passage. Mandrel 12 is then locked to the bearing portion 13, and the machine is ready to make rectangular tubing. The paper strips 51, 52 (and others if more are being used) are started on mandrel 52, and, to start production, the mandrel is rotated a few turns by hand to provide a portion of tubing having engagement with the rollers 59.

When the end of the tubing is in firm engagement with the rollers 59, the power can be supplied to drive-shaft 30, and automatic operation of the machine will take place. As the subframe 24 is rotated by sprocket chain 38, the rollers 59, in intimate contact with tubing 18 overlying mandrel 12, will transmit torque to mandrel 12 and cause its rotation at the same speed as subframe 24. The rotation of mandrel 12 will, of course, remove paper stock from the rolls and cause the formation of a laminated tube on mandrel 12 upstream of the forming machine 17. At the same time, the rollers 59 are being positively driven in the direction which will urge tubing 18 forward on the mandrel. As they urge the tubing forward, the rollers 59 are also flattening and forming the paper laminations into the integral tube desired, and are, by application of pressure, setting the adhesive with which the upper laminations are coated. The finished tubing 18 emerges from the downstream end of forming machine 17 and runs off the free end of mandrel 12. Any suitable means may be provided for cutting off tubing 18 in the desired lengths as it is formed and discharged from the end of mandrel 12.

It will be apparent to persons skilled in the art that the "pitch" of the laminations 51 and 52 (and others, if used) will be determined by the relative speeds of the rollers 59 and the mandrel 12. Increase in the rotational speed of the rollers will urge the tubing along the mandrel more rapidly and thereby increase the length of tubing generated per rotation of the mandrel. Adjustment of the winding pitch to the desired value may be accomplished by the use of any desired method for altering the relative speeds of sprockets 25 and 27. While I have, in the present embodiment, shown a variable speed pulley drive, any type of variable speed transmission will serve as well.

While I have shown herein apparatus for positively rotating all of the rollers 59, and while such is my preferred arrangement, it will be obvious to those skilled in the art that tubing can be successfully formed with apparatus wherein only a portion of the rollers 59 are positively rotated, the others serving simply to maintain pressure against the tubing and rotating only because of their rim contact with the advancing tubing. Therefore, I desire it understood that my invention is not limited to a structure wherein all the rollers are driven positively.

While I have in this specification described in detail a single embodiment of my invention, I wish it understood that that detailed description was exemplary only. Many changes and departures from the structure shown in the drawing may be made by persons skilled in the art without departing from the spirit of my invention. Therefore it is my wish that the scope of my invention be determined primarily by reference to the appended claims.

I claim:

1. In apparatus for forming laminated tubing and having a polygonal mandrel adapted to have laminating strips wound thereon, a forming machine surrounding said mandrel and being adapted to be rotated, and sets of shaft-equipped rollers carried by said machine and being oppositely paired in substantially parallel alignment for engagement with opposite sides of said mandrel, means for adjustably supporting said sets of rollers and for positively driving the same, comprising a pair of elongated bearing blocks for each of said rollers and each being provided with releasable means for adjustably securing the same to said machine, each of said blocks having longitudinally-spaced recesses therethrough aligned with said rollers, a bearing slidably received in each of said recesses and in turn rotatably supporting an end of a roller shaft, spring means for urging said bearings toward said mandrel, bearing means mounted upon one block of each pair for rotatably receiving drive shafts, and gear means connecting each of the drive shafts with the roller shafts in each set of rollers for positively rotating said rollers.

2. The structure of claim 1 wherein each of said blocks is equipped with an elongated seat adjacent each of said recesses, and an elongated bar mounted in each of said seats cooperates with said spring means to urge said bearings toward said mandrel.

3. Apparatus according to claim 2 wherein said bearing blocks are joined at opposite ends thereof by turnbuckles adjustable when said releasable means are released to adjust the spacing between said bearing blocks and thereby the spacing between oppositely-disposed sets of rollers.

4. In tube-forming apparatus having a polygonal mandrel supported for rotation and being adapted to have laminating strips wound thereon, a forming machine supported for rotation about the longitudinal axis of said mandrel comprising a pair of shaft-equipped rollers alignable with opposite sides of said mandrel for engagement with laminating strips wound thereon, at least one of said rollers being rotatably driven to advance laminating strips engaged thereby longitudinally along said mandrel, a pair of bearings for each of said rollers and rotatably receiving respectively opposite end portions of the shafts thereof, a bearing block for each said bearing and supporting the same for movement toward and away from said mandrel, means for biasing each bearing with respect to its bearing block toward said mandrel, means for adjustably supporting said bearing blocks for movement toward and away from said mandrel along the direction of bias of said bearings, and adjustable means for selectively positioning each bearing block with respect to said mandrel, whereby the spacing between corresponding bearing blocks is adjustable to accommodate mandrels of different size independently of the biasing force urging the rollers toward the mandrel.

References Cited in the file of this patent

UNITED STATES PATENTS

| Number | Name | Date |
|---|---|---|
| 444,350 | Gray | June 6, 1891 |
| 964,595 | Wilkie | July 19, 1910 |
| 1,054,961 | Dean | Mar. 4, 1913 |
| 1,055,007 | Woodward et al. | Mar. 4, 1913 |
| 1,172,151 | Maltby | Feb. 15, 1916 |
| 1,418,562 | Haase | June 6, 1922 |
| 1,872,152 | Maltby | Aug. 16, 1932 |
| 1,913,447 | Huston et al. | June 13, 1933 |
| 1,932,942 | Thordarson | Oct. 31, 1933 |
| 1,975,681 | Brawn | Oct. 2, 1934 |
| 2,067,513 | Talbot | Jan. 12, 1937 |
| 2,453,537 | Phillips | Nov. 9, 1948 |
| 2,518,263 | Aabel | Aug. 8, 1950 |